(12) United States Patent
Rapaport

(10) Patent No.: US 7,040,831 B2
(45) Date of Patent: May 9, 2006

(54) BOOM POSITIONING MECHANISM

(76) Inventor: Walter Rapaport, 750 Verde St., Jerome, AZ (US) 86331

( * ) Notice: Subject to any disclaimer, the term of this patent is extended or adjusted under 35 U.S.C. 154(b) by 0 days.

(21) Appl. No.: 10/322,861

(22) Filed: Dec. 20, 2002

(65) Prior Publication Data

US 2004/0120787 A1    Jun. 24, 2004

(51) Int. Cl.
*F16B 27/00* (2006.01)

(52) U.S. Cl. ............... 403/84; 403/91; 248/124; 84/421

(58) Field of Classification Search ........... 403/83–85, 403/87, 88, 91, 95, 96; 248/124; 84/421
See application file for complete search history.

(56) References Cited

U.S. PATENT DOCUMENTS 2,548,650 A * 4/1951 Brandt .................. 248/413
5,836,561 A * 11/1998 Liao .................... 248/291.1
6,316,706 B1 * 11/2001 Sammons ................. 84/327

* cited by examiner

*Primary Examiner*—John R. Cottingham
(74) *Attorney, Agent, or Firm*—Michael L. Harrison

(57) ABSTRACT

An improved design of positioning mechanism, mountable to an upright, allows smooth, readily accomplished adjustment of the angular, rotational and translational positions of a boom with respect to the upright. A hub is mounted to and rotatable with respect to a base. A friction plate between the base and the hub applies frictional forces that are established by the mechanism, by urging the hub and base together. A pressure sleeve partially contained in a matching opening in the hub controls the rotational and longitudinal movement of the boom with respect to the hub. The design of the frictional engagement surfaces allows adjustment of the resistance to movement of the boom in the angular, rotational and translational directions to extend smoothly and predictably from a condition of virtually no resistance to a completely locked and rigid condition.

21 Claims, 6 Drawing Sheets

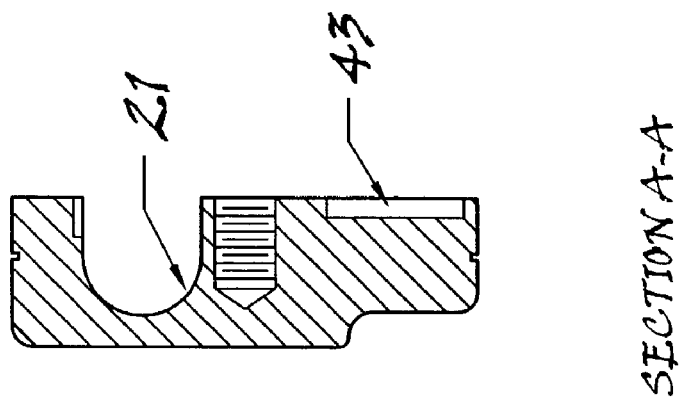
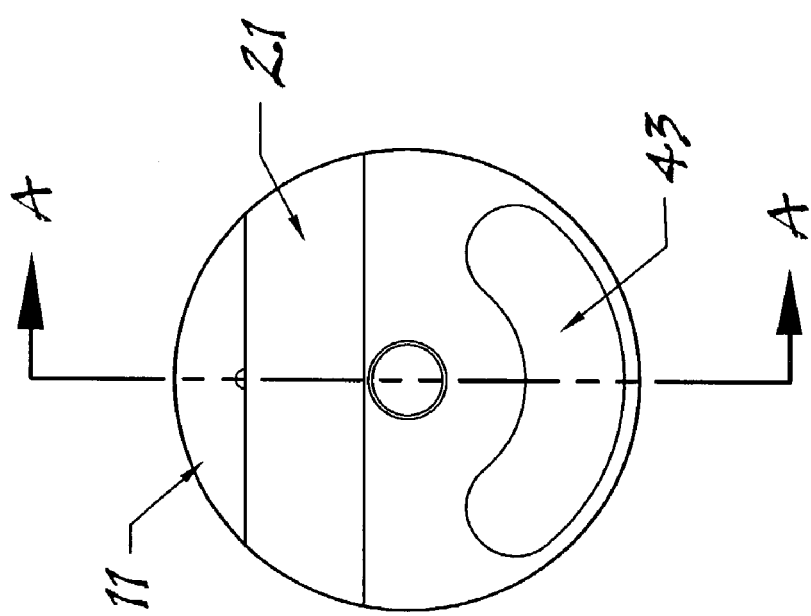

SECTION A-A

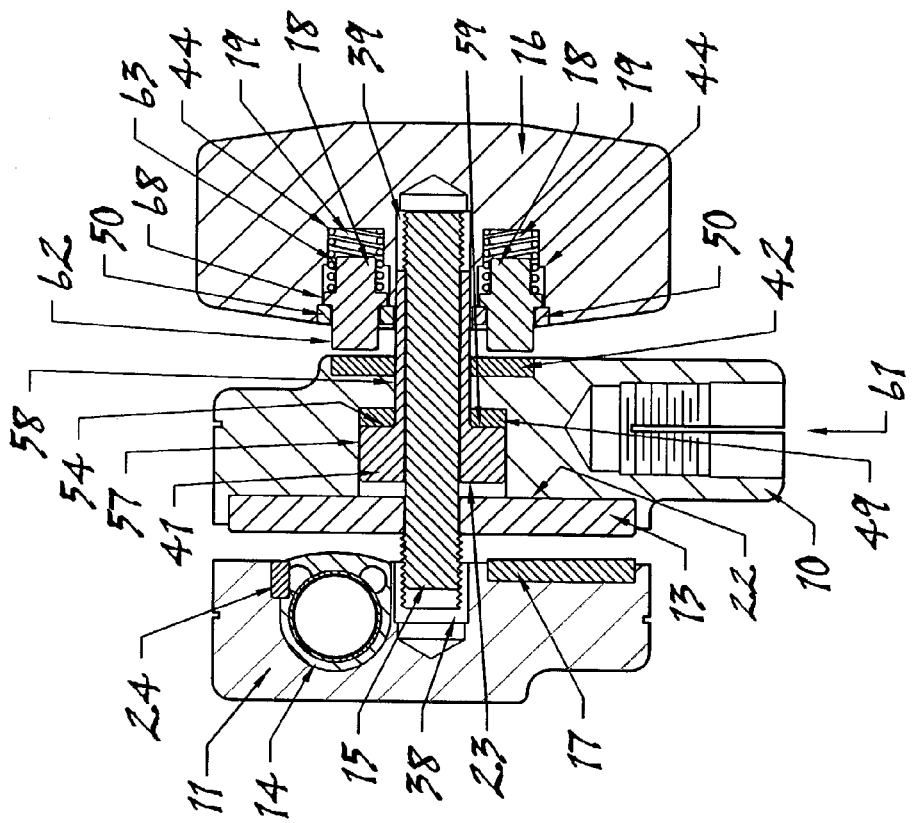
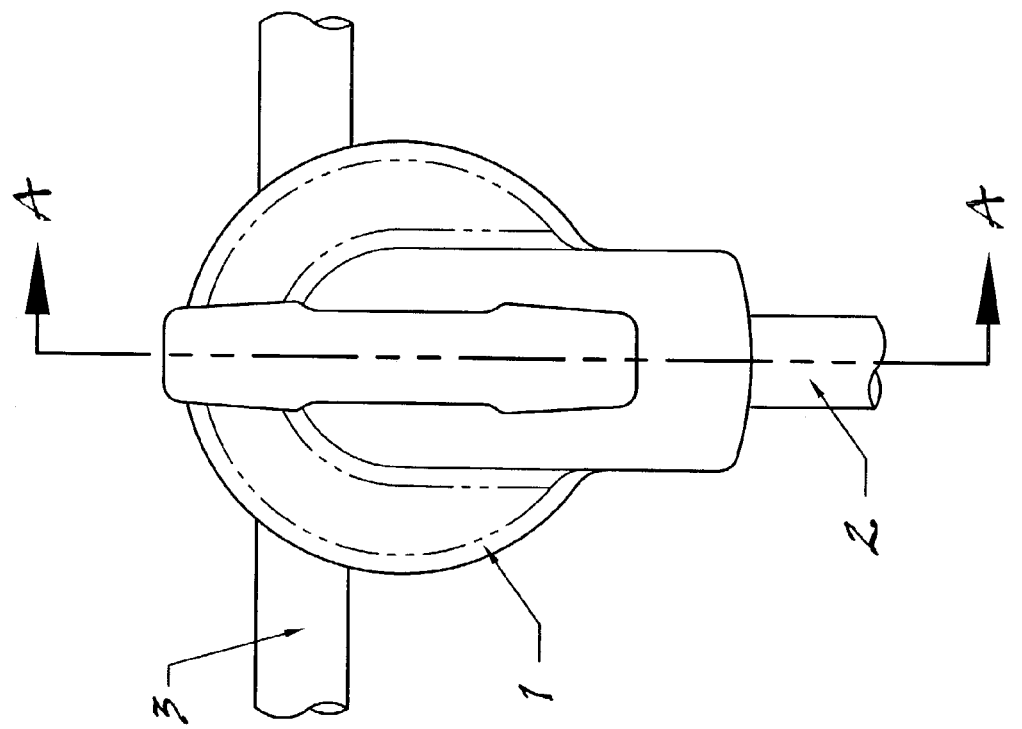
FIG. 6B
SECTION A-A
FIG. 6A

BOOM POSITIONING MECHANISM

BACKGROUND OF THE INVENTION

1. Field of the Invention

The present invention relates to positioning mechanisms, and in particular to positioning mechanisms for adjustably holding equipments at the desired angular, translational and rotational positions with respect to a mounting support.

2. Prior Art

It is well known for use as equipment support stands to employ a combination of an upright, extending upwardly from a floor base, with a boom mounted to the upright by means of a an adjustable support mechanism, which mechanism allows positioning and holding in position a variety of equipments of the types that may require a variety of large and small position adjustments. The needs for these adjustments may occur frequently and randomly. Such an adjustable apparatus is particularly useful in conjunction with the type of equipment which often requires critical placement, but which also requires adjustment through experimentation, such as microphones, lights, cameras, lamps, gauges, medical instruments and the like.

A variety of stands and positioning mechanisms are presently known and in use for adjustably positioning items carried by such mechanism. However, existing positioning mechanisms are frequently complicated and cumbersome. Such devices all employ some variation of a boom arm carried on an upright, the boom arm being angularly positionable as well as longitudinally positionable with respect to the stand. To fix or lock the boom arm in any desired longitudinal or angular position, various types of locking mechanisms are employed. Regardless of the particular type of locking mechanism used, the prior art devices generally employ multiple separate locking mechanisms, one for the purpose of locking the boom arm against angular movement, and one to lock the boom against translational and rotational movement. As a consequence, the user often has to manipulate at least two separate locking mechanisms to position the equipment at the desired location. The use of the separate locking mechanisms means that the user must deal with them individually at each adjustment.

The existing stands are generally adequate for their intended uses, but there is a need for a mechanism which can position and hold a boom at a wide variety of angles relative to the upright column, allow the extension of the boom outward from the upright column, and allow for rotation of the boom to orient (to aim, for example), the equipment being held, and then to securely hold the boom at any selected angle.

In general, the prior art devices use friction to hold the boom in the desired position. If the prior art locking mechanism is the type having a variable force capability, the friction adjustment may be either loosened, allowing movement of the boom against the frictional force, or increased, effectively preventing the movement of the boom in any direction.

Most of the prior art devices do not aim to achieve, and are not designed to allow for, a controllable application of friction. While it is possible to accomplish some degree of gradual adjustment of the prior art mechanisms by using the method of loosening the prior art friction adjustment, this method is makeshift, at best, because the prior art mechanism is not readily adjustable to a precise force, and the resistance to movement is therefore neither predictable nor finely adjustable.

A need exists therefore for a positioning mechanism having a simple construction which allows precise and repeatable adjustment of the amount of applied friction, in order to allow adjustment of the boom in all three directions of movement: angular, rotational and translational.

SUMMARY OF THE INVENTION

It is one object of the present invention to provide a boom positioning mechanism such that a boom engaged by the mechanism and capable of carrying an equipment at its distal end can be locked against angular, rotational and translational movement by a single locking mechanism.

It is another object of the present invention to provide a boom positioning mechanism that is adjustably movable against precisely adjusted friction forces.

It is another object of the present invention to provide a boom positioning mechanism that having three modes of operation.

It is another object of the present invention to provide a boom positioning mechanism that is easily adjusted by one hand It is another object of the present invention to provide a boom positioning mechanism that is rugged, durable and foolproof design.

It is another object of the present invention to provide a boom positioning mechanism that is smoothly operable.

It is another object of the present invention to provide a boom positioning mechanism that is relatively fail safe.

It is another object of the present invention to provide a boom positioning mechanism that has precise adjustment capability but is readily manufacturable.

These and other objects of the present invention are accomplished by providing an improved design of positioning mechanism, mountable to an upright, which allows smooth, readily accomplished adjustment of the angular, rotational and translational positions of a boom with respect to the upright. In the present positioning mechanism a hub is mounted to and rotatable with respect to a base, which base is in turn fixed to the upright or another suitable attachment point. A friction plate between the base and the hub applies frictional forces that are established by the mechanism, by means of adjustment of a threaded shaft for example. The hub and base are adjustably compressed to cause the friction plate to frictionally engage the hub and base to control the ease of angular movement. As the compression of the base and hub is adjusted, the friction plate is likewise compressed between them. A pressure sleeve partially contained in a matching opening in the hub controls the rotational and longitudinal movement of the boom with respect to the hub. The external cross section of the pressure sleeve is designed to increase the frictional engagement of the sleeve with the friction plate along its length. The shape of the pressure sleeve and its large contact area with the friction plate causes the translational movement of the boom to be resisted more than is the angular and rotational movement. The design of the frictional engagement surfaces allows adjustment of the resistance to movement of the boom in the angular, rotational and translational directions to extend smoothly and predictably from a condition of virtually no resistance to a completely locked and rigid condition.

BRIEF DESCRIPTION OF THE DRAWINGS

FIG. 3A is a front view of the hub of the positioning mechanism in accordance with the present invention.

FIG. 3B is a side, sectional view, taken through section A—A of FIG. 3A, of the hub of the positioning mechanism in accordance with the present invention.

FIG. 6A is a back view the positioning mechanism in accordance with the present invention, shown from the base side of the positioning mechanism.

FIG. 6B is a side, sectional view, taken through section A—A of FIG. 6A, of the positioning mechanism in accordance with the present invention, showing in cross-section the base, the hub, the handle, and intermediate components mounted thereto.

DESCRIPTION OF THE PREFERRED EMBODIMENT

General Description of the Positioning Mechanism

Figure 1:
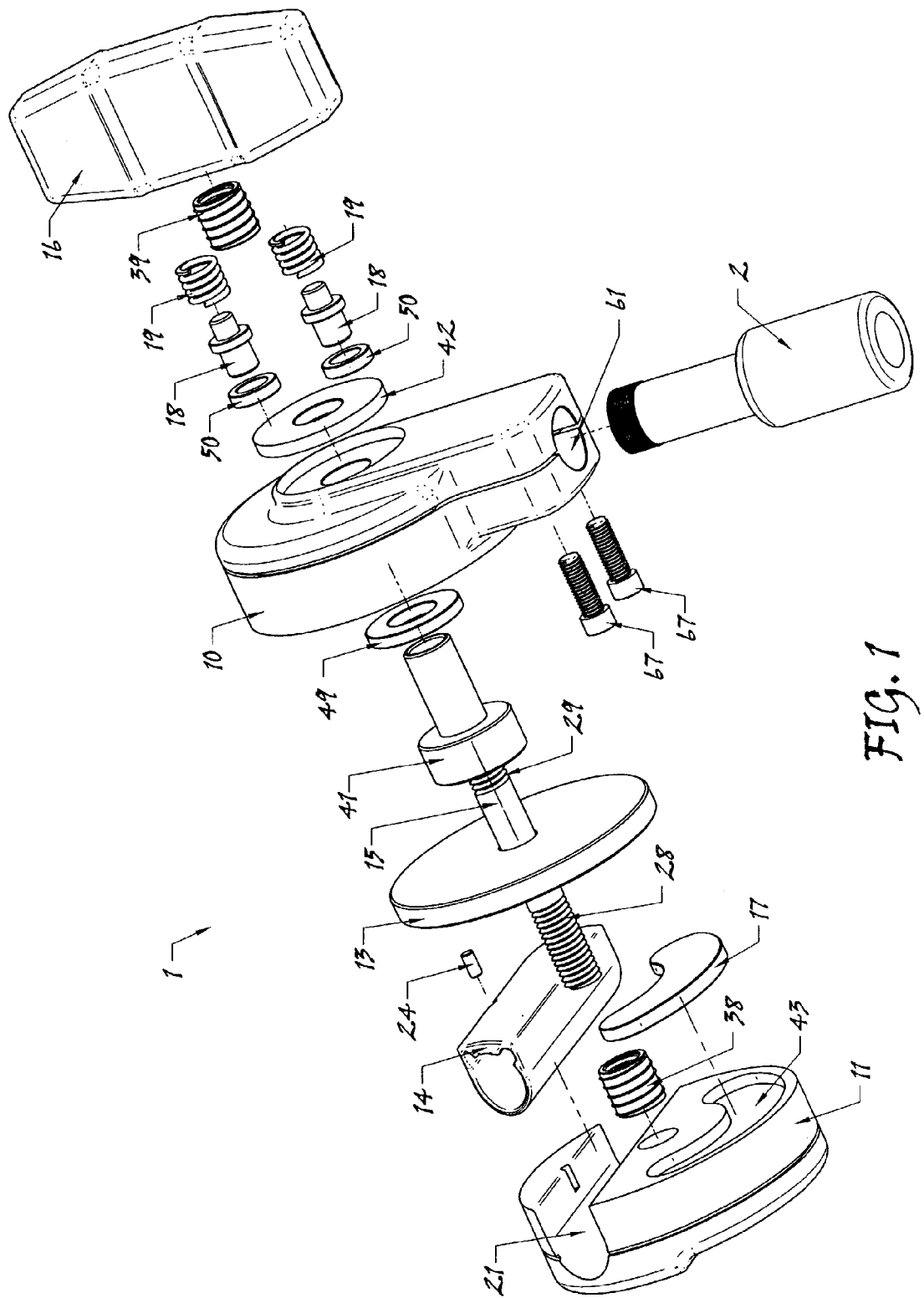
FIG. 1 is a disassembled, exploded, perspective view of the positioning mechanism in accordance with the present invention.
Figure 4B:
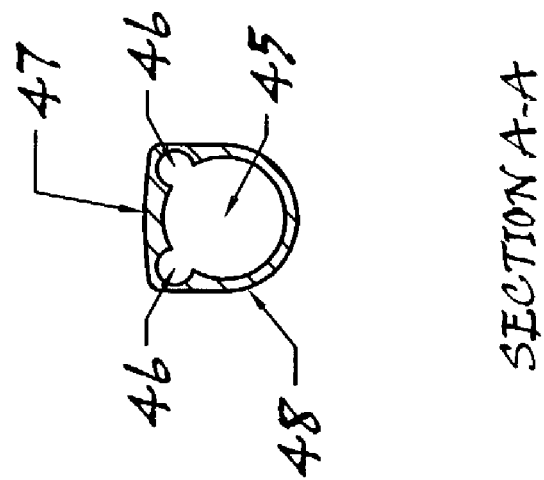
FIG. 4B is a side, sectional view, taken through section A—A of FIG. 4A, of the pressure sleeve of the positioning mechanism in accordance with the present invention.
Figure 4A:
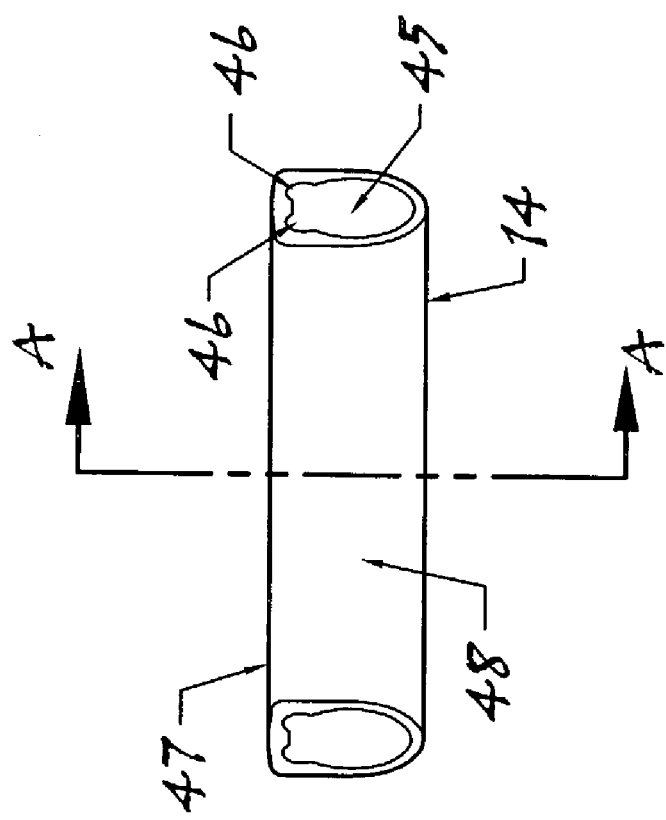
FIG. 4A is a front view of the pressure sleeve of the positioning mechanism in accordance with the present invention.
Figure 5:
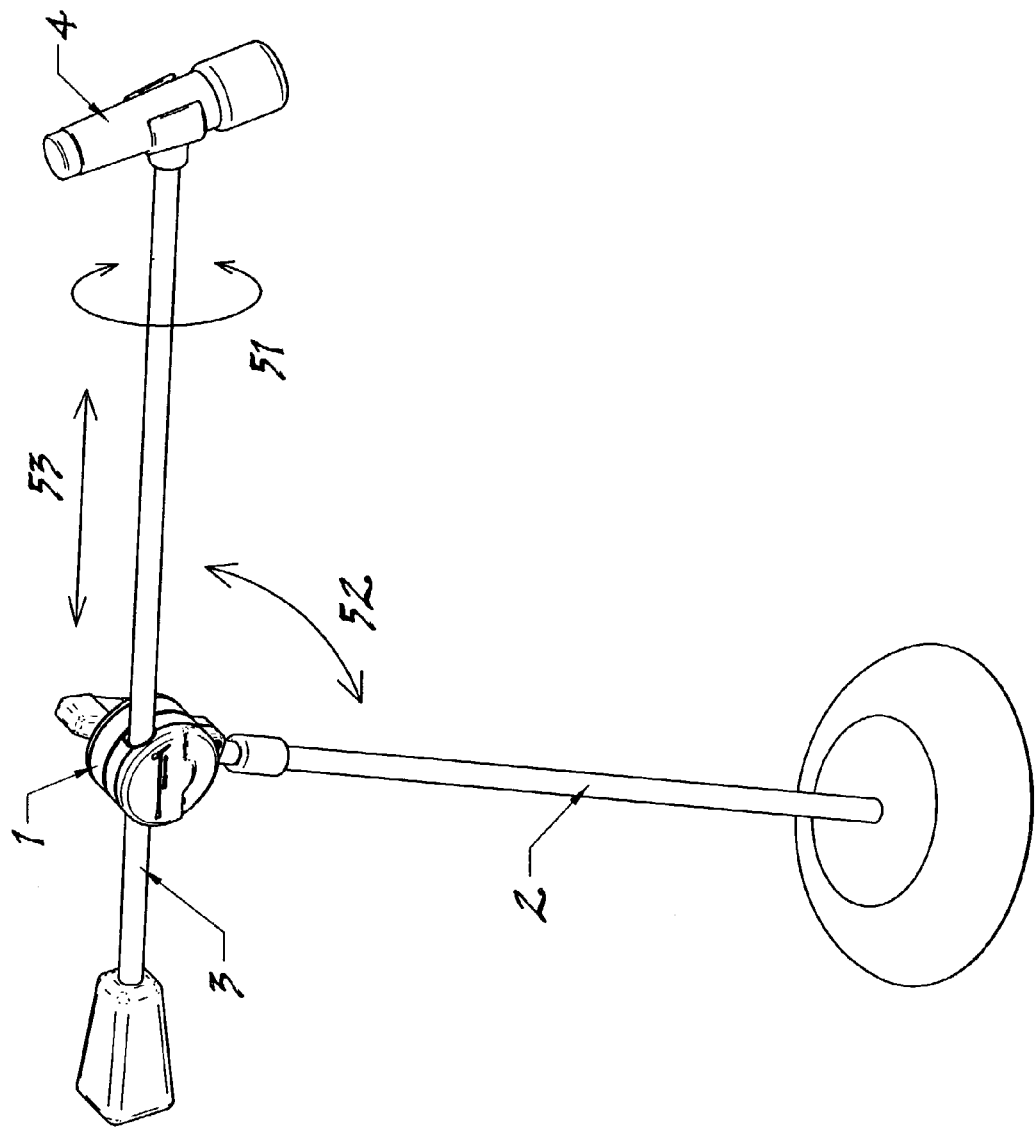
FIG. 5 is a perspective view of the positioning mechanism of the present invention, shown in use with a prior art microphone upright and boom, and indicating for reference the directions of movement which are provided and controlled by the present invention.

Referring now to the figures, wherein like numbers represent like elements throughout the several views, FIG. 1 and FIG. 5 show an adjustable boom positioning mechanism generally designated by the numeral 1. FIGS. 1, 2A, 2B, 3A, 3B, 4A, 4B, 6A and 6B show the parts and the structure of the positioning mechanism 1.

An overall, exploded, perspective view of the positioning mechanism 1 is shown in FIG. 1. However, as shown in FIG. 5, its use in a commonly encountered application, that of providing support for a microphone 4, will aid in understanding the invention.

As shown in FIG. 5, the microphone support comprises a main upright 2, and a boom 3 on which a microphone 4 is installed. The boom 3 is mounted to the upright 2 by means of the positioning mechanism 1 of the present invention. As mounted, the positioning mechanism 1 allows the adjustment of the microphone into virtually any position reachable by angular, rotational and translational positioning of the boom. For consistency and convenient reference, the directions of the three movements are defined, as shown in FIG. 5, and detailed further in FIG. 1:

1) angular movement—movement of the boom by angular displacement of the hub 11, pivoting with respect to the base 10, (movement indicator arrow 52);

2) rotational movement—movement of the boom 3 around its longitudinal axis (movement indicator arrow 51); and 3) translational movement—movement of the boom longitudinally, by sliding the boom within and with respect to the positioning mechanism's hub 11 and by displacement along its length (movement indicator arrow 53).

The critical design requirement of the positioning mechanism 1 is that the design establish the correct relationship among these three forces such that the desired ratios among them are achieved, in turn assuring the desired relationship of ease of movement as to angular, rotational and translational movement of the device with respect to the mounting attachment point, and, reciprocally, the desired ratios of resistance to those movements.

The interrelationship among these forces is controlled such that the angular movement of the boom 3 is more easily accomplished than rotational movement, and rotational is more easily accomplished than translational movement.

Referring now to FIG. 1, there are shown the major elements of the positioning mechanism 1 in a disassembled, exploded, perspective view. The positioning mechanism 1 comprises, in its most essential parts, a base 10 that ordinarily serves as the fixed side of the mechanism, a hub 11 that serves as the movable side of the mechanism, and a friction plate 13, all concentrically mounted on the axis of shaft 15, as well as a friction sleeve 14, and pressure pad 17 mounted to hub 11.

Base 10 and hub 11 are urged together to compress the intermediate parts, including the friction plate 13, friction sleeve 14, and friction pad 17. Pressure is applied by turning handle 16 and shaft 15 to cause the thread 28 to advance into insert 38, thereby cooperating to apply pressure on intermediate parts Shaft 15 is an extensive cylindrical member having at least two threaded regions, threads 28 and threads 29, which threaded regions engage the mating threads in threaded insert 38 and threaded insert 39 respectively. The threads are coarse, providing for fine adjustment of the forces applied over a small range of motion (approximately 90 degrees) by urging the base 10 and the hub 11 together.

Handle 16 is attached to shaft 15 by way of insert 39, which is locked to the threads 29 of shaft 15 by any suitable means, such as a thread-locking compound. Handle 16 is preferably designed to be easily tightened and loosened by hand, and to be capable of applying a sufficiently large amount of torque to cause the positioning mechanism 1 to become "locked" when the shaft is fully tightened. When the mechanism 1 is not locked, controllable pressure may be applied as the base 10 and the hub 11 are urged together. The pressure thus applied, due to the design of the pressure controlling elements, is made to be consistent and controllable, as described in more detail below.

Springs 19 operate on plungers 18, all of which are mounted in handle 16. Plungers 19 operate in conjunction with disk 42, to cause the handle 16 to remain in position even when the hub 11 is being rotated, as described in more detail below.

Base 10 and hub 11 are preferably made of aluminum, which is desirable for this application because of its light weight, low cost, capability of relatively low temperature casting, and desirable surface finish options. Because aluminum is not capable of supporting strong threads, steel inserts, such as insert 38 and insert 39, are employed where strong threads are required.

Likewise, aluminum needs additional strength to prevent deformation at locations where high forces are applied. That condition occurs at the point where force from the steel stepped bushing 41 is applied to the friction plate 13. The stepped bushing 41 has a contacting surface 23, not visible in FIG. 1, but shown in FIG. 6B, which cooperates with friction plate 13, friction sleeve 14, friction pad 17, and hub 11, all of which, by applying controllable amounts of pressure, produce adjustable and controllable amounts of friction for control of the movement of the boom 3 and hub 11.

To distribute the force applied and to prevent local deformation of the aluminum, the smaller diameter 58 of stepped bushing 41, as shown in FIG. 6B, is pressed into an interference fit in handle 16. As the base 10 and hub 11 are drawn together, the contacting surface 23 of the stepped bushing 41 is urged against the surface 22 of the friction plate 13. The contacting surface 23 is firmly in contact with the friction plate 13 when in the fully locked position.

The smaller diameter 58 of stepped bushing 41 is made to be a running fit to the bore 60 in base 10 through which it passes. The step 59 in the diameter of the stepped bushing 41 causes the combination of the stepped bushing 41, shaft 15 and handle 16 to be held captive in base 10. The larger diameter 57 of the stepped bushing 41 should either clear or be a sliding fit to all surrounding parts of the base 10.

The back side 54 of the step 59 in stepped bushing 41 would wear directly on aluminum it no provision were made to prevent it. Washer 49 is therefore pressed into an interference fit in base 10, so that the side 59 of stepped bushing 41 and washer 49 contact and provide bearing surfaces for one another, whereby washer 49 prevents steel-to-aluminum contact, for both better wear performance and smoother operation. Washer 49 also maintains axial alignment of the sub-assembly comprising bushing 41, shaft 15 and handle 16.

When the handle 16 is tightened, the hub 11 is drawn towards the friction plate 13 causing the friction sleeve 14 to tighten and to slightly compress the crowned pressure surface 47 of friction sleeve 14. This causes the friction sleeve 14 to clamp onto the boom 3 and ensure that it remains firmly in place.

Figure 2C:
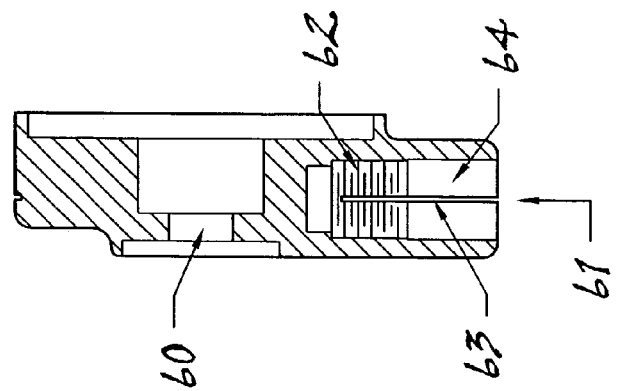
FIG. 2C is a side, sectional view, taken through section B—B of FIG. 2A, of the base of the positioning mechanism in accordance with the present invention.
Figure 2B:
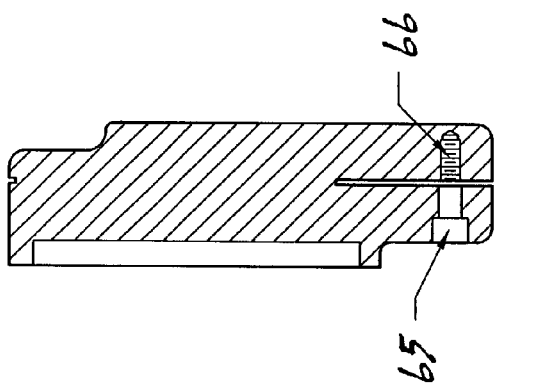
FIG. 2B is a side, sectional view, taken through section A—A of FIG. 2A, of the base of the positioning mechanism in accordance with the present invention.
Figure 2A:
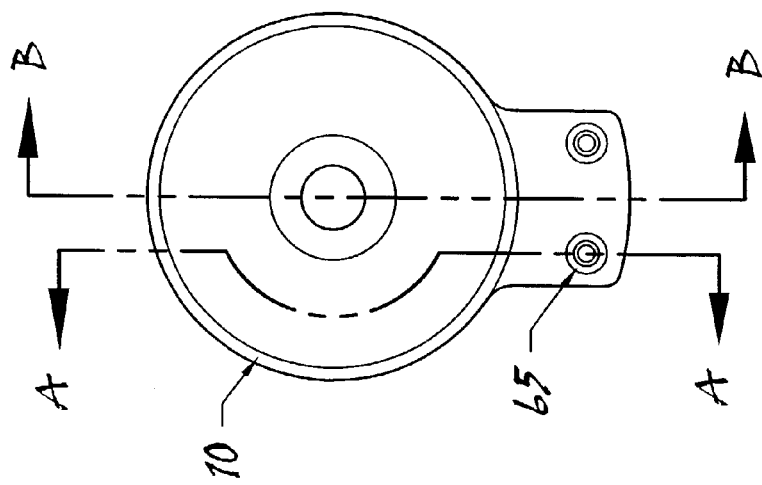
FIG. 2A is a front view of the base of the positioning mechanism in accordance with the present invention.

The base 10 includes a unique adaptor for attachment to prior art uprights such as upright 2. Visible in FIG. 2C, the adaptor includes a partially threaded, slotted socket 61, adapted to fit the diameter of the upright 2 of the usual prior art stands having a tubing exterior diameter of approximately 1.9 cm, and having threads adapted to fit the customary threads of the upright 2. The threads 62 are made to extend over only a portion of the depth of the socket, so that a smooth wall area 64 of approximately 1.2 cm remains toward the open end of the socket 61. A slot 63 runs over the length of the socket and almost to the end of thread 62 of socket 61. The slot 63 allows the sides of the socket on each side of the slot to be compressed toward one another. Clearance bores 65, shown in FIG. 2B, on one side of the slot 63, and threaded bores 66 on the other side provide means for threaded fasteners 67, shown in FIG. 1, to compress the base 10 on each side of the slot 63. When tightened into their matching threaded bores 66, the fasteners 67 reduce the width of the slot 63, tightening the sides toward one another and providing secure clamping to the upright 2, whether it is threaded or unthreaded.

The slotted socket 61 is preferably a fairly snug but slideable fit for the outside diameter of the upright 2. By maintaining the snug fit, the clear bore 64 provides a guide for alignment of the upright with the centerline of the threaded portion of the bore, and prevents the cross-threading or mis-threading that is so common in the conventional mounts.

This adaptation also allows the positioning mechanism 1 to be used in cases where the threads of the upright 2 are damaged, or the upright has no threads at all.

Once the upright 2 is inserted into the slotted socket 61, if the upright is unthreaded, the clamping action of the fasteners 67 pulling into the threads 66 provides the only means to secure the mounting. If the upright is threaded, the clamping action of the fasteners 67 pulling into the threads 66 provides stronger and more permanent mounting than the upright threads alone.

The more robust mounting provided by the slotted socket 61 is advantageous in any application that requires the utmost in strength and security. It is especially appreciated in applications where a performer aggressively handles a microphone, or where especially heavy equipment is to be supported.

Detailed Description—friction Sleeve

Boom 3, shown in FIG. 5, is held within friction sleeve 14, which sleeve is the only part of the positioning mechanism 1 that makes direct contact with the boom 3. The friction applied by friction sleeve 14 controls the ease with which the boom may be moved rotationally and translationally with respect to the positioning mechanism 1. Its properties are therefore critical in achieving the desired control of frictional forces that are applied to the boom, and that regulate the ease of rotational and translational movement of the boom 3.

Friction sleeve 14 is preferably made of ultra high molecular weight (UHMW) polyethylene, or a similar material having similar characteristics. The important characteristics of the material chosen are: that it retain its memory and flexibility after compression, so that when the applied pressure is released it will quickly, easily, and accurately resume its uncompressed state; that it have the desired blend of the properties of firmness and flexibility, and; that it be readily moldable into fairly complex shapes. If the material is insulating, its insulating property will also provide electrical isolation between the user and the base 10 of the stand, a factor which may be important in some situations for considerations of signal integrity, or safety, or both.

The geometry of the friction sleeve 14 is key to the correct operation of the positioning mechanism 1. In particular, it is necessary that the frictional force that resists rotational movement and the frictional force that resists translational movement have the desired ratio. In the preferred embodiment, these forces are adjusted such that it is easier to make movement in the rotational direction than in the translational direction.

The friction sleeve 14 is fitted into a suitably matching cavity 21 in the hub 11. Longitudinal motion of the sleeve 14 with respect to the hub 11 must be prevented, so a small dowel 24, which engages the sleeve 14 and a mating cavity 21 in the hub 11, is used to prevent the friction sleeve 14 from moving within the hub 11.

The geometry of the friction sleeve 14 is the means by which the forces within the mechanism are given the desired balance. Normally, in a sliding fit sleeve, the tightness of the fit, the type of material employed, and the length of the sleeve engaging the boom 3 are important factors in determining how strongly movement of the boom 3 is restrained. Although a precise balance of forces could be achieved for a single set of conditions by using a pre-established selections of these factors, the application of this technique would be of limited use because it could only provide a positioning device for one set of boom lengths, equipment weights, and the like. In other words, it would not be adjustable. Moreover, even that single set of conditions would be difficult to control and therefore expensive to accurately reproduce in mass production quantities.

In the preferred embodiment, these frictional forces are established and made adjustable by providing a specially configured cross section of the sleeve, which applies and controls two basic frictional forces:

1) the force that resists rotational movement—movement of the boom 3 around its longitudinal axis (movement indicator arrow 51); and
2) the force that resists translational movement—movement of the boom longitudinally, by sliding the boom within and with respect to the positioning mechanism's hub 11 and by displacement along its length (movement indicator arrow 53).

The preferred embodiment of the friction sleeve 14 is shown in detail in FIG. 4A and FIG. 4B. The friction sleeve 14 has a main interior bore 45 having a generally cylindrical cross section, and an exterior surface 48 that follows the cylindrical shape for approximately 180 degrees, then forms a relatively flattened, slightly crowned, crowned pressure surface 47. The interior bore 45 runs the length of the sleeve, and, when under no compression, is a slideable fit to the boom 3. Two small grooves 46 run the length of the friction sleeve 14. These grooves are located on the side of the friction sleeve 14 which is intended to face the friction plate 13, and are intended to isolate the crowned pressure surface 47 from that of the remainder of the sleeve 14, so that pressure applied to the crowned pressure surface 47 does not excessively deform the remainder of the sleeve 14. This makes the application of frictional forces by the sleeve 14 more predictable. The shape of the crowned pressure surface 47 is adapted to make a broad area of contact with the friction plate 13, and to make possible a predictable and controllable application of pressure as the crowned pressure surface 47 is urged towards friction plate 13 due to the tightening of the shaft 15 in the hub 11. These forces are adjusted and made to have the desired relationships by making the friction sleeve 14 conform to the approximate proportions shown in FIG. 4A and FIG. 4B.

Detailed Description—friction plate and Pressure Pad

The angular movement of the boom 3 is controlled by the frictional forces that resist angular movement of the hub 11 with respect to the base 10. Those forces are a result of the friction of the friction plate 13 against the crowned pressure surface 47 and the pressure pad 17. Although there is some friction due to contact with the crowned pressure surface 47 of the friction sleeve 14, the main frictional force on the friction plate 13 that resists angular movement is due to the contact of the friction plate by the pressure pad 17. This force is controlled by the rotation of the handle 16, and even though there is some contact with the friction sleeve 14, this pad force predominates and is relied upon for control.

Pressure pad 17 is installed in the hub 11 diametrically opposite to the location of the friction sleeve 14. Pressure pad 17 is preferably of thick laminar shape, having a plan outline that is roughly arcuate so that it generally follows the curvature of the friction plate 13 and provides maximum contact to the friction plate 13, by presenting its complete surface to the plate. A receptacle 43 contains the pressure pad 17 by, preferably, an interference fit. The pressure pad 17 is urged into contact with the friction plate 13 by hub 11 being drawn towards the base 10.

Friction plate 13, preferably made of a highly non-compressible material, such as tool steel, is shown in FIG. 1, and FIG. 6B, which figures illustrate the preferred design. The use of tool steel for the friction plate provides the necessary friction when the friction plate 13 pressing against the pressure pad 17 in hub 11, and provides in addition a wear resistant face. Friction plate 13, preferably force fitted into the base 10, preventing its rotation with respect to the base 10 and thereby providing more predictable friction forces by interaction with the friction sleeve 13 and the pressure pad 17.

When a compressive force is applied to the friction plate 13, the force is applied on the side adjacent to hub 11 by contact with the pressure pad 17 and the crowned pressure surface 47 of the friction sleeve 14, and on the side adjacent to the base 10 by the stepped bushing 41.

Since the pressure pad is diametrically opposite to the friction sleeve 14, a pair of balancing and controllable forces is applied by the friction sleeve 14 and the pressure pad 17 on the friction plate 13. The friction plate 13 is normally supported away from the surface of hub 11 by these forces, and does not, in the unlocked condition, ever make other than incidental contact with the hub 11.

Detailed Description—Pressure Springs and Plungers

Located in handle 16 are plungers 18, spring-loaded by springs 19, which are so positioned that the plungers are urged toward the base 10. Each plunger 18/spring 19 combination is located in its respective receptacle 44 in handle 16, shown in FIG. 6B. Each plunger 18/spring 19 combination is retained by retaining ring 50.

Plungers 18 have a flange 68 located on the length of the plunger 18, which flange 68 is larger than the diameter of the plunger at either end 62 or end 63, which allows retention of the plunger 18 and provides a platform against which the spring 19 pressure may be applied. Each retaining ring 50 has an inner diameter sufficient to clear the diameter of the plunger 18. Each retaining ring 50 is force fitted into the matching receptacle 44, so that the plunger 18 is loosely contained and its motion is restricted, but each plunger 18/spring 19 combination is still allowed to be compressed and decompressed in response to applied forces.

Spring 19, of which there are two identical ones employed in the preferred embodiment, is preferably selected to have an uncompressed length that is large in comparison to its fully compressed length. It is also selected to have an overall length and is to be installed in such a way that in normal operation the spring is always compressed to approximately the mid-point of its maximum compression. During operation, from its most compressed to its least compressed the length of the spring 19 varies only a small percentage of its total length. By maintaining the spring 19 within that narrow range, it is made to operate within a narrow range of compression, and therefore maintains a relatively linear coefficient of restitution (spring constant), so that the force it applies gas the positioning mechanism is compressed varies in turn as a fairly linear function of the compression applied by the handle 15 shaft 16.

Plungers 18 make contact with the washer 42, creating a frictional force to prevent the handle 16 from rotating with the hub 11 during adjustment of the position of the boom 3, or in the event that the boom 3 is accidentally released while it is being positioned by a user. If accidentally released, the falling boom 3 will cause the shaft 15 to rotate in a tightening direction, which causes the positioning mechanism 1 to tend toward lockup, thereby restraining the fall of the boom 3 and preventing potential damage to sensitive equipment.

Description of Operation

The operation of the positioning mechanism may be understood by considering separately the three conditions, which shall be referred to as "stages," into which its operation falls. This operational description begins from an assumed initial condition in which the mechanism is locked. "Locked" in this context means that the handle 16 has rotated the shaft 15 to cause the thread portion 28, engaged with insert 38, to advance into the insert 38, urging the hub and base toward one another, and causing the stepped bushing 41 to make contact with friction plate 13 to provide the required frictional forces to the parts of the positioning mechanism 1. When locked, the compression of the intermediate parts by hub 11 and base 10 resists all movement, against normal manually applied forces, in any of the three directions of movement, angular, rotational or translational, as defined above.

The present design makes the application of friction forces by the friction sleeve 14 adjustable as a function of the force applied by the base and hub. Under a no-pressure condition (i.e.: the hub and base are maximally loosened) the design provides a loose sliding lit between the sleeve 14 and the boom 3. As pressure is applied by compressing the hub and base together, the friction plate 13 frictionally engages surface 47.

Thus, the friction forces applied by the friction sleeve 14 are a function of the pressure that is externally applied to the sleeve, and makes the forces adjustable over a wide range.

From the locked condition, handle 16 will be gradually rotated in the loosening direction (preferably counter clockwise as viewed from the handle 16 end of the shaft 15) reducing the force exerted on the hub 11 and base 10, and causing force on the internal parts to be similarly reduced. As these forces are progressively reduced, there may be separately considered three stages:

In Stage One, the pressure applied by the rotation of the shaft 15/handle 16 has been reduced from the fully locked condition. This makes possible angular movement through an arc that is centered approximately on the axis of shaft 15. Once the boom 3 has been positioned, the friction forces are sufficient to maintain its position without re-tightening shaft 15/handle 16 (the braking action).

In Stage Two, the shaft 15/handle 16 combination has been loosened somewhat more than in Stage One. Due to the balance of friction forces described above, the boom 3 maintains the ability to readily make angular and rotational adjustments as in Stage One. The lesser force applied to the side of friction sleeve 14 allows the same braking action described in Stage One to minimize free angular and rotational movement of boom 3.

In Stage Three the user loosens the shaft 15/handle 16 still more than in Stage Two. The user can then move the boom 3 angularly, can rotate the boom 3 within the friction sleeve 14, and can slide the boom longitudinally within the friction sleeve 14, with only slight resistance. However, the same braking action described in Stage One and Two operates to minimize free translational movement of boom 3, and to lessen free fall of the boom 3.

From analysis of the mechanism, it may be seen that these three Stages are the result of the design of three distinct parts of the mechanism, in which parts forces are selectively created that are used in order to control the frictional forces that apply to, and thereby resist or prevent movement of the boom. The positioning mechanism 1 thereby controls the ease of movement of the boom 3. The unique operation of the device depends upon relationships among these parts and the three distinct frictional forces that they create.

Although the present invention has been described in connection with an example of the preferred embodiment thereof, it will be appreciated by those skilled in the art that the present invention is not limited merely to those embodiments shown. Many variations and modifications can be made without departure from the spirit of the present invention. For example, the materials, the particular shapes, and the arrangement of the base 10 and the hub 11, and the arrangements of the friction sleeve 14 and its matching opening in the hub 11, as well as their particular locations, can be changed from those which are illustrated. When the boom 3 is long or its weight is great, a larger frictional force is required to prevent the boom 3 from sagging down. This may require that the positioning mechanism itself be made larger. These and other variations are specifically contemplated. Accordingly, variation of the preferred form and the particulars as described for the present invention may be undertaken without departure from the scope of the invention, which is defined only by the claims which follow.

What is claimed is:

1. A mechanism for securely and adjustably retaining a boom in any selectable angular, rotational and translational positions in relation to a support, comprising, in operative combination:
   a friction sleeve generally enclosing at least a portion of the boom,
   a base, mountable to the support;
   a hub, rotatably mounted to the base, having a recess that encloses at least a portion of the friction sleeve within the hub and;
   means for urging the base and the hub together.

2. The mechanism of claim 1, wherein the friction sleeve has interior dimensions such that it will slidably fit over the boom and has exterior dimensions such that at least part of the sleeve will fit into the recess in the hub.

3. The mechanism of claim 1, further comprising a friction plate, located between the hub and the base.

4. The mechanism of claim 1, wherein:
   the friction sleeve has interior dimensions such that it will slidably fit over the boom and has exterior dimensions such that at least part of the sleeve will fit into the recess in the hub, and;
   a friction plate located between the hub and the base.

5. The mechanism of claim 4, further comprising a pressure pad, retained in the hub and disposed to contact the friction plate generally opposite the point of contact of the friction sleeve.

6. The mechanism of claim 4, wherein the means for urging the base and the hub together further comprises:
   a threaded shaft extending through the hub, the base, and the friction plate, and rotatably engaging the base;
   engagement means cooperating with the threaded shaft and engaging with the hub and with the base such that rotating the threaded shaft in a selected direction causes the hub and the base to be urged toward each other.

7. The mechanism of claim 2, wherein the friction sleeve has an exterior shape that is in part eccentric with respect to the longitudinal axis of the boom.

8. A mechanism for securely and adjustably retaining a boom in any selectable angular, rotational and translational positions in relation to a support, comprising, in operative combination:
- a friction sleeve generally enclosing at least a portion of the boom,
- a base, mountable to the support;
- a hub, rotatably mounted to the base, having a recess that encloses at least a portion of the friction sleeve within the hub, and;
- a threaded shaft extending through the base, and rotatably engaging the base, and engaging the threaded bore of the hub, such that rotating the threaded shaft causes the hub and the base to be urged toward each other.

9. The mechanism of claim 8, wherein the friction sleeve has interior dimensions such that it will slidably fit over the boom and has exterior dimensions such that at least part of the sleeve will fit into the recess in the hub.

10. The mechanism of claim 8, further comprising a friction plate, located between the hub and the base.

11. The mechanism of claim 8, wherein the friction sleeve has interior dimensions such that it will slidably fit over the boom and has exterior dimensions such that at least part of the sleeve will fit into the recess in the hub, and further comprising a pressure pad, retained in the hub and placed such that the pressure pad contacts the friction plate generally opposite the point of contact of the friction sleeve as the hub and the base are urged toward each other, and a friction plate, located between the hub and the base.

12. The mechanism of claim 11, wherein the friction sleeve has an exterior shape that is in part eccentric with respect to the longitudinal axis of the boom.

13. The mechanism of claim 9, wherein the threaded shaft is the axis of rotation for rotation of the hub with respect to the base.

14. The mechanism of claim 10, wherein the threaded shaft is the axis of rotation for rotation of the hub with respect to the base.

15. The mechanism of claim 11, wherein the threaded shaft is the axis of rotation for rotation of the hub with respect to the base.

16. The mechanism of claim 12, wherein the threaded shaft is the axis of rotation for rotation of the hub with respect to the base.

17. The mechanism of claim 8, further comprising means for impeding the rotational freedom of the shaft with respect to the base.

18. The mechanism of claim 9, further comprising means for impeding the rotational freedom of the shaft with respect to the base.

19. The mechanism of claim 10, further comprising means for impeding the rotational freedom of the shaft with respect to the base.

20. The mechanism of claim 11, further comprising means for impeding the rotational freedom of the shaft with respect to the base.

21. The mechanism of claim 12, further comprising means for impeding the rotational freedom of the shaft with respect to the base.

* * * * *